United States Patent [19]

Nakano et al.

[11] 4,016,846
[45] Apr. 12, 1977

[54] INTAKE AND EXHAUST MANIFOLD SYSTEM FOR INTERNAL COMBUSTION ENGINE

[75] Inventors: Soichi Nakano, Kawagoe; Yasumichi Ohama, Mitaka; Masao Watanabe, Asaka, all of Japan

[73] Assignee: Honda Giken Kogyo Kabushiki Kaisha, Tokyo, Japan

[22] Filed: July 16, 1975

[21] Appl. No.: 596,469

[30] Foreign Application Priority Data

July 18, 1974  Japan .................................. 49-81693

[52] U.S. Cl. ...................... 123/122 AB; 123/52 M; 123/75 B
[51] Int. Cl.² ................... F02M 31/08; F02B 19/10
[58] Field of Search .......... 123/32 ST, 32 SP, 75 B, 123/122 AB, 122 AC, 122 R, 52 M; 165/52; 60/282, 323

[56] References Cited

UNITED STATES PATENTS

| | | | |
|---|---|---|---|
| 3,635,031 | 1/1972 | Haddad | 60/323 |
| 3,703,083 | 11/1972 | Tadokoro | 60/322 |
| 3,780,715 | 12/1973 | Flitz | 123/122 AB |
| 3,877,444 | 4/1975 | Senga et al. | 123/122 AB X |
| 3,878,826 | 4/1975 | Date et al. | 123/32 SP X |
| 3,895,617 | 7/1975 | Sakurai | 123/32 SP X |
| 3,908,620 | 9/1975 | Maekawa | 123/122 AB |

*Primary Examiner*—C. J. Husar
*Assistant Examiner*—Tony M. Argenbright
*Attorney, Agent, or Firm*—Lyon & Lyon

[57] ABSTRACT

A multi-cylinder internal combustion engine of the type having an auxiliary combustion chamber associated with each main combustion chamber, and connected thereto by a torch opening, is provided with a manifold system in which the exhaust gases are used to heat a rich air-fuel mixture supplied to the auxiliary combustion chambers and is also used to heat the lean air-fuel mixture supplied by the primary carburetor barrel to the main combustion chambers, but the lean air-fuel mixture supplied by the secondary carburetor barrel is not heated. The secondary carburetor barrel comes into action only when the engine is operating under heavy load, so that the unheated additional lean mixture improves the volumetric efficiency and thereby improves the power output of the engine. Thin wall liners and heat transfer plates having low thermal capacity are provided for the exhaust passages in the engine, the interior of the exhaust manifold, and the heat exchange surfaces for heating the rich mixture and that portion of the lean mixture provided by the primary carburetor barrel.

4 Claims, 2 Drawing Figures

INTAKE AND EXHAUST MANIFOLD SYSTEM FOR INTERNAL COMBUSTION ENGINE

This invention relates to internal combustion engines of the type having an auxiliary combustion chamber associated with each main combustion chamber and connected thereto by a torch opening. Such an engine is shown in the Date et al, U.S. Pat. No. 3,890,942 granted June 24, 1975. In the device disclosed in that patent a rich mixture is supplied from one carburetor barrel to the auxiliary combustion chambers and a lean mixture is supplied from another carburetor barrel to the main combustion chambers. In practice, three separate carburetor barrels are employed, one for the rich mixture and two for the lean mixture. Of the latter two, one is brought into action only when the engine is operating under heavy load.

In accordance with this invention, the rich mixture and one of the lean mixtures are heated by the exhaust gases to assure full vaporization of the mixtures, but the lean mixture from the remaining carburetor barrel is not heated. Since this barrel comes into action only when the engine is operating under heavy load, it is desirable to supply a relatively cool mixture to improve volumetric efficiency of the engine, and thereby obtain maximum horsepower.

Accordingly, this invention contemplates the provision of cooperating intake and exhaust manifolds in which the heat of the exhaust gases prevents condensation of air-fuel mixtures admitted into the main and auxiliary combustion chambers, while also supplying additional lean air-fuel mixture which is unheated, when maximum horsepower is required.

Other and more detailed objects and advantages will appear hereinafter.

Figure 1:
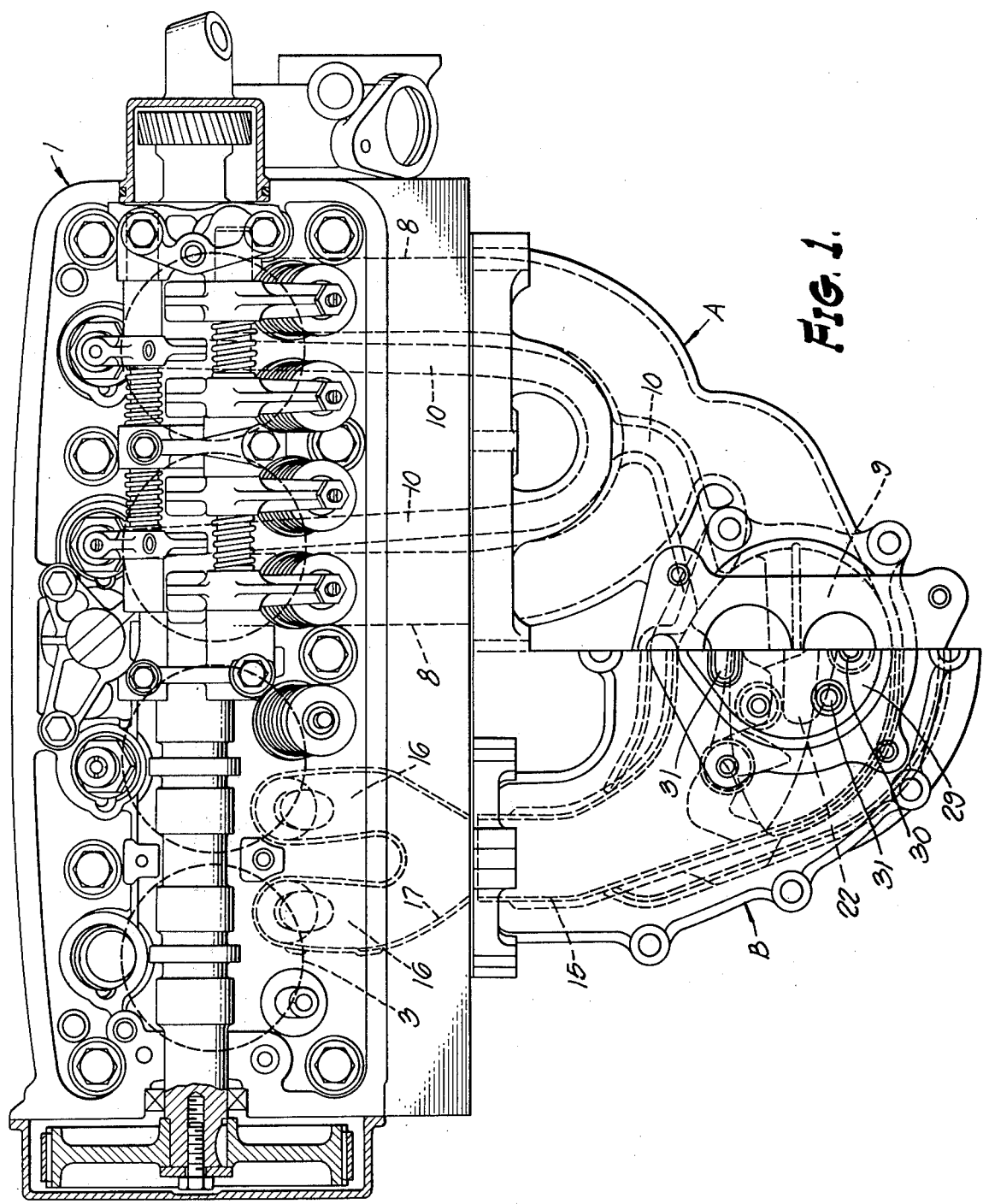
FIG. 1 is a plan view partly broken away and partly in section, showing a preferred embodiment of this invention.
Figure 2:
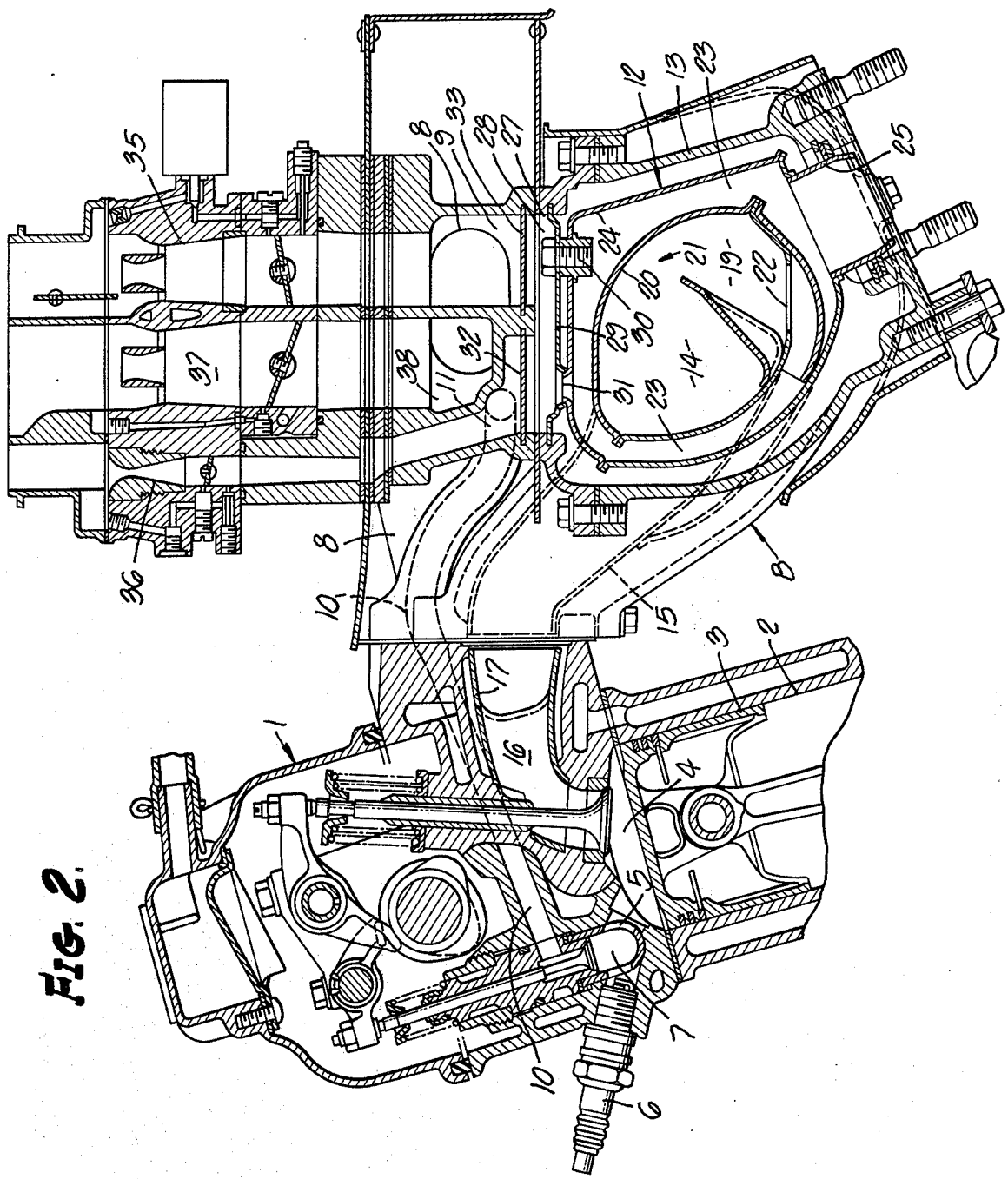
FIG. 2 is a sectional side elevation thereof.

Referring to the drawings, the engine 1 has multiple cylinders 2 each provided with a piston 3 forming one wall of a main combustion chamber 4. An auxiliary combustion chamber 7 is connected to each main combustion chamber 4 through a torch opening 5. A spark plug 6 is provided for each auxiliary combustion chamber 7.

An intake manifold A has walls forming primary intake chamber 9 connected to each main combustion chamber 4 through intake passages 8. The intake manifold A also has walls forming an auxiliary intake chamber 11 connected to each auxiliary combustion chamber 7 through auxiliary intake passages 10. An exhaust manifold B comprises a double wall liner 12 spaced within and enveloped by a thick wall housing 13. The thin walls of the liner 12 are formed of a heat resistant metal having low thermal capacity, such as, for example, stainless steel. The exhaust collection chamber or first chamber 14 within the liner 12 receives exhaust gases from the engine through collector pipes 15 comprising a part of the liner 12. Each collector pipe 15 receives exhaust gases from two adjacent exhaust passages 16 in the engine 1. The exhaust passages 16 are preferably lined by a lining 17 of thin wall heat resistant metal having a low thermal capacity, for example, stainless steel.

The exhaust gases pass from the first chamber 14 into the second chamber 19 within the inner liner wall 20 through the opening 21. Exhaust gases pass from the second chamber 19 through the opening 22 and into the third chamber 23 between the inner wall 20 and the outer wall 24. The third chamber 23 envelops the first chamber 14 and the second chamber 19. Exhaust gases escape from the third chamber 23 through the discharge pipe 25 and pass through a silencer, not shown. The heat of the exhaust gases is retained within the lining 17 of the exhaust passages 16 and within the double wall liner 12 within the housing 13, and the tortuous path for exhaust gases provided through the chamber 14, 19 and 23 holds the exhaust gases at relatively high temperature for a relatively long residence time. Since the overall air-fuel ratio of mixtures admitted into the combustion chambers is leaner than stoichiometric, there is an excess of oxygen in the exhaust gases. The long residence time at high temperature of the gases within the exhaust manifold causes harmful CO to be changed to harmless $CO_2$ and causes continuing oxidation of HC to reduce unburned hydrocarbons in the exhaust gases when discharged into the atmosphere.

Walls 27 on the housing 13 define an upward facing opening 28. A heat resistant plate 29 closes this opening 28, and this plate 29 is formed of the same material as the double wall liner 12. Threaded fastenings 30 connect the plate 29 to the outer wall 24 of the liner 12. The outer wall 24 and the plate 29 have a plurality of aligned openings 31 to permit exhaust gases from the third chamber 23 to contact the plates 32 and 33. These plates are formed of heat resistant thin wall metal of low thermal capacity, for example, stainless steel. Heat is transferred from the exhaust manifold B through plate 32 to heat the rich mixture in the auxiliary intake chamber 11. Similarly, heat is transferred from the exhaust manifold B through the plate 33 to heat the lean mixture in the primary intake chamber 9.

The primary carburetor barrel 35 delivers a lean mixture to the primary intake chamber 9, and the auxiliary carburetor barrel 36 delivers a rich mixture to the auxiliary intake chamber 11. The secondary carburetor barrel 37 also delivers a lean mixture, but this barrel is active only when the engine is operated under heavy load, and remains inactive during idling or low load conditions. Accordingly, the secondary intake chamber 38 is spaced from the opening 28 and is not heated by the exhaust gases. It discharges into the same intake passage 8 as the primary intake chamber 9. The relatively low temperature of the additional lean air-fuel mixture supplied through the secondary intake chamber 38 increases the total weight of air-fuel mixture supplied to the engine, with consequent improvement in power output. The mixture provided in the secondary intake chamber 38 is not only unheated, but is affected by heat absorption involved in evaporation of the auxiliary mixture, so that it is inducted into the engine at a relatively low temperature.

The fact that the exhaust gases in the third chamber 23 are caused to act on the heat transfer plates 32 and 33 is grounded on the following reasons: during low to medium power operation of the engine, exhaust gases are made to react in the first chamber 14 or in both the first chamber 14 and the second chamber 19. The oxidation reactions provide additional heat, so the heating of the plates 32 and 33 does not have any significant detrimental effect on said reaction, and therefore the discharge of CO and HC into the atmosphere is minimized. Furthermore, during high power operation of the engine, there is no disadvantageous effect, because of the relatively large quantity of exhaust gases. The use of heat resistant lining material within the exhaust ports of the engine assists in maintaining the exhaust gases at as high a temperature as possible in the exhaust collection chamber 14, so that emission control is further improved. This is particularly effective during low load operation of the engine.

Having fully described our invention, it is to be understood that our invention is not to be limited to the details herein set forth, but that our invention is of the full scope of the appended claims.

We claim:

1. In a multi-cylinder internal combustion engine of the type having an auxiliary combustion chamber associated with each main combustion chamber and connected thereto by a torch opening, the improvement comprising, in combination: an intake manifold including a primary intake chamber having a lower wall, a secondary intake chamber having a lower wall, and an auxiliary intake chamber having upper and lower walls, means to supply air-fuel mixture to said intake chambers, first passage means for connecting said primary and secondary intake chambers to the main combustion chambers, second passage means for connecting the auxiliary intake chamber to the auxiliary combustion chambers, an exhaust manifold disposed below said intake manifold and including a housing having walls defining an upward facing opening, said lower wall of said primary intake chamber and said lower wall of said auxiliary intake chamber being in heat exchange relationship with said housing opening, whereby exhaust gases within said housing act to heat the air-fuel mixtures in said primary chamber and said auxiliary chamber, said lower wall of said secondary intake chamber being formed by said upper wall of said auxiliary intake chamber to dispose said auxiliary intake chamber substantially below said secondary intake chamber, whereby transfer of heat to the air-fuel mixture in said secondary chamber is minimized.

2. In a multi-cylinder internal combustion engine of the type having an auxiliary combustion chamber associated with each main combustion chamber and connected thereto by a torch opening, the improvement comprising, in combination: an intake manifold including a primary intake chamber having a lower wall, a secondary intake chamber having a lower wall, and an auxiliary intake chamber having upper and lower walls, means to supply air-fuel mixtures to said intake chambers, first passage means for connecting said primary and secondary intake chambers to the main combustion chambers, second passage means for connecting the auxiliary intake chamber to the auxiliary combustion chambers, an exhaust manifold disposed below said intake manifold and comprising a thin wall metallic liner enveloped by and spaced within a thick wall housing, said housing having walls defining an upward facing opening, said liner having walls defining at least one upward facing opening, said lower wall of said primary intake chamber and said lower wall of said auxiliary intake chamber being in heat exchange relationship with said housing opening whereby exhaust gases acting through said openings serve to heat the air-fuel mixtures in said primary chamber and said auxiliary chamber, said lower wall of said secondary chamber being formed by said upper wall of said auxiliary intake chamber to dispose said auxiliary intake chamber substantially below said secondary intake chamber, whereby transfer of heat to the air-fuel mixture in said secondary chamber is minimized.

3. In a multi-cylinder internal combustion engine of the type having an auxiliary combustion chamber associated with each main combustion chamber and connected thereto by a torch opening, the improvement comprising, in combination: an intake manifold including a primary intake chamber having a lower wall, a secondary intake chamber having a lower wall, and an auxiliary intake chamber having upper and lower walls, means to supply air-fuel mixtures to said intake chambers, first passage means for connecting said primary and secondary intake chambers to the main combustion chambers, second passage means for connecting the auxiliary intake chamber to the auxiliary combustion chambers, an exhaust manifold disposed below said intake manifold and comprising a thin wall metallic liner enveloped by and spaced within a thick wall housing, said housing having walls defining an upward facing opening, said liner having walls defining at least one upward facing opening, said lower wall of said primary intake chamber being formed by a plate, said lower wall of said auxiliary intake chamber being formed by a plate, each of said plates being formed of thin wall metal of low heat capacity, each plate being located adjacent said housing opening whereby exhaust gases acting through said opening serve to heat both of said plates and thereby heat air-fuel mixtures in said primary chamber and said auxiliary chamber, said lower wall of said secondary chamber being formed by said upper wall of said auxiliary intake chamber to dispose said auxiliary intake chamber substantially below said secondary intake chamber, whereby transfer of heat to the air-fuel mixture in said secondary chamber is minimized.

4. In a multi-cylinder internal combustion engine of the type having an auxiliary combustion chamber associated with each main combustion chamber and connected thereto by a torch opening, the improvement comprising, in combination: an intake manifold including a primary intake chamber having a lower wall, a secondary intake chamber having a lower wall, and an auxiliary intake chamber having upper and lower walls, means to supply air-fuel mixtures to said intake chambers, first passage means for connecting said primary and secondary intake chambers to the main combustion chambers, second passage means for connecting the auxiliary intake chamber to the auxiliary combustion chambers, exhaust passages in the engine lined with metal of low heat capacity, an exhaust manifold disposed below said intake manifold and comprising a thin wall metallic liner enveloped by and spaced within a thick wall housing and connected to said exhaust passages, said housing having walls defining an upward facing opening, said liner having walls defining at least one upward facing opening, said lower wall of said primary intake chamber and said wall of said auxiliary intake chamber being in heat exchange relationship with said housing opening whereby exhaust gases acting through said openings serve to heat the air-fuel mixtures in said primary chamber and said auxiliary chamber, said lower wall of said secondary chamber being formed by said upper wall of said auxiliary intake chamber to dispose said auxiliary intake chamber substantially below said secondary chamber, whereby transfer of heat to the air-fuel mixture in said secondary chamber is minimized.

* * * * *

UNITED STATES PATENT AND TRADEMARK OFFICE
CERTIFICATE OF CORRECTION

PATENT NO. : 4,016,846
DATED : April 12, 1977
INVENTOR(S) : SOICHI NAKANO et al

It is certified that error appears in the above-identified patent and that said Letters Patent are hereby corrected as shown below:

Claim 4, line 58, "said wall" should read --said lower wall--.

Signed and Sealed this thirtieth Day of August 1977

[SEAL]

Attest:

RUTH C. MASON
Attesting Officer

C. MARSHALL DANN
Commissioner of Patents and Trademarks